W. H. KIRKSEY.
HAMES.
No. 173,022.    Patented Feb. 1, 1876.
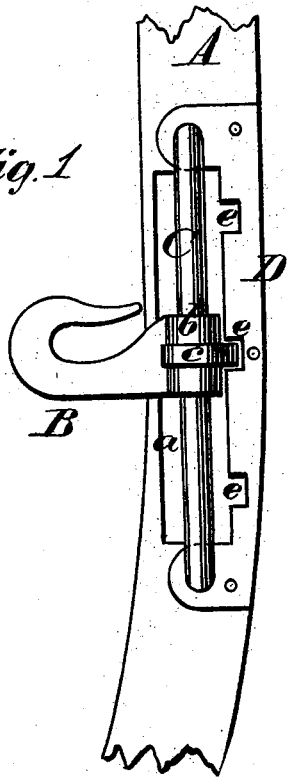
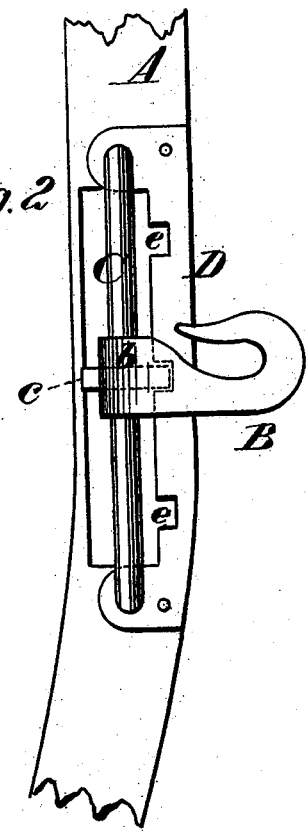
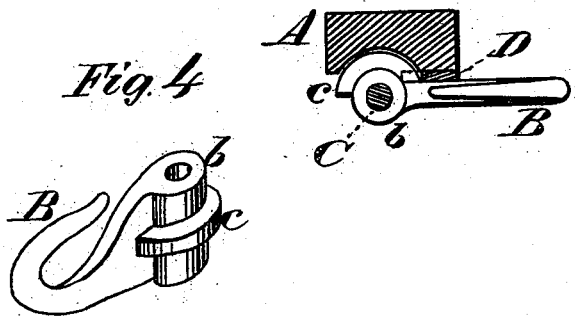

UNITED STATES PATENT OFFICE.

WELLINGTON H. KIRKSEY, OF RIENZI, MISSISSIPPI.

IMPROVEMENT IN HAMES.

Specification forming part of Letters Patent No. 173,022, dated February 1, 1876; application filed January 8, 1876.

*To all whom it may concern:*

Be it known that I, WELLINGTON H. KIRKSEY, of Rienzi, in the county of Alcorn and State of Mississippi, have invented a new and valuable Improvement in Hames; and I do hereby declare that the following is a full, clear, and exact description of the construction and operation of the same, reference being had to the annexed drawings, making a part of this specification, and to the letters and figures of reference marked thereon.

Figures 1 and 2 of the drawings are representations of plan views of my hame, and Figs. 3 and 4 are detail views thereof.

This invention has relation to means for attaching trace-hooks to hames, whereby the hooks can be adjusted up or down, for the purpose of properly fixing the line of draft on the shoulders of the animal.

The nature of my invention consists in a flanged segment formed on the eye-piece of the draft-hook, in combination with a rod, about which the said hook articulates, and a notched plate, which, with the rod, is rigidly secured to the hame, as will be hereinafter explained.

In the annexed drawings, A designates part of a wooden hame; B, the draft-hook; C, the round rod or staple about which the hook articulates; and D is a plate, which is rigidly secured to the hame on one side of a recess, $a$, made in this hame. The eye-piece $b$ of the hook B is considerably elongated to give strength and steadiness to it, and at the middle of the length of this eye-piece a semicircular flange, $c$, is formed, which is designed to engage in one or the other of several notches, $e$, formed in the plate D, and hold the hook at the desired point. When the hook B is adjusted, as shown in Fig. 1, the flange $c$ is free from the plate D, and the hook can be raised or lowered on the staple C, and when the flange $c$ is opposite a notch, $e$, and the hook is turned one-quarter around, it will be held in the desired position. The ends of the staple C are driven through the ends of the plate D, through the hame, and are clinched firmly, thus firmly holding said plate on the hame.

What I claim as new, and desire to secure by Letters Patent, is—

A draft-hook, B, constructed with an elongated eye-piece, $b$, having a flange, $c$, in combination with the staple C and the notched plate D, substantially as described.

In testimony that I claim the above I have hereunto subscribed my name in the presence of two witnesses.

WELLINGTON HENRY KIRKSEY.

Witnesses:
   E. A. CLARK,
   E. L. BULLOCK.